Figure 1:
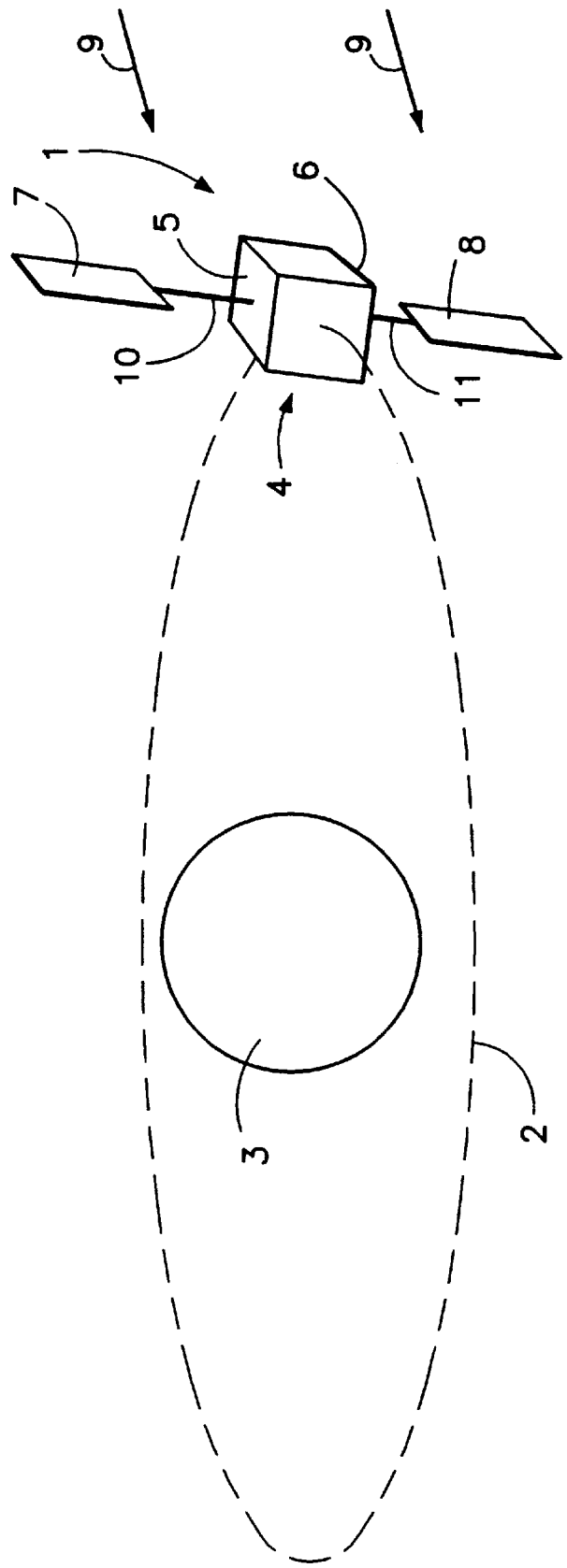

United States Patent
Bard

[11] Patent Number: 6,098,931
[45] Date of Patent: Aug. 8, 2000

[54] SATELLITE WITH IMPROVED HEAT SINKAGE

[75] Inventor: Max Bard, Le Cannet, France

[73] Assignee: Alcatel, Paris, France

[21] Appl. No.: 09/104,199

[22] Filed: Jun. 25, 1998

[30] Foreign Application Priority Data

Jun. 26, 1997 [FR] France .................. 97 08007

[51] Int. Cl.⁷ .............. B64G 1/44; B64G 1/00; B64G 1/46
[52] U.S. Cl. .............. 244/173; 244/158 R; 244/158 A; 244/163
[58] Field of Search .............. 244/173, 163, 244/168, 158 R, 57, 158 A; 165/41, 42, 171, 104.14, 43, 44

[56] References Cited

U.S. PATENT DOCUMENTS

| | | |
|---|---|---|
| 3,603,530 | 9/1971 | Easton . |
| 4,591,116 | 5/1986 | Guenther et al. ............ 244/168 |
| 4,725,023 | 2/1988 | Shiki .................. 244/158 R |
| 4,880,050 | 11/1989 | Nakamura et al. ............ 165/41 |
| 5,296,285 | 3/1994 | Babel et al. ............ 244/158 A |
| 5,332,030 | 7/1994 | Spencer et al. ............ 165/41 |
| 5,494,241 | 2/1996 | Poulain .................. 244/163 |
| 5,634,612 | 6/1997 | Faisant .................. 244/173 |
| 5,787,969 | 8/1998 | Drolen et al. ............ 165/41 |
| 5,794,890 | 8/1998 | Jones, Jr. et al. ............ 244/163 |
| 5,798,574 | 8/1998 | Coronel ............ 244/173 |
| 5,806,800 | 9/1998 | Caplin ............ 244/158 R |
| 5,816,540 | 10/1998 | Murphey et al. ............ 244/173 |
| 5,823,476 | 10/1998 | Caplin ............ 244/158 R |
| 5,833,175 | 11/1998 | Caplin ............ 244/158 R |
| 5,884,868 | 3/1999 | Long et al. ............ 244/158 A |

FOREIGN PATENT DOCUMENTS

| | | |
|---|---|---|
| 0 132 768 | 2/1985 | European Pat. Off. . |
| 0 447 049 | 9/1991 | European Pat. Off. . |
| 849166 | 6/1998 | European Pat. Off. . |
| 2 605 287 | 4/1988 | France . |
| 3-114999 | 5/1991 | Japan ............ 244/163 |
| 3-189299 | 8/1991 | Japan ............ 244/163 |

Primary Examiner—Peter M. Poon
Assistant Examiner—Charles R. Ducker, Jr.
Attorney, Agent, or Firm—Fisher, Christen & Sabol

[57] ABSTRACT

A satellite, especially a geostationary satellite, which includes: at least one face (5) which is used as a thermal radiator for the equipment carried on board the satellite (1) and is arranged in the path of the solar radiation (9); at least one solar panel (7) which is a generator of electricity, which is pointed continuously toward the sun and projects from the face (5); and a screen (14) secured to the solar panel (7), which is arranged at the periphery of the satellite and which stops the solar radiation (9) directed toward the face (5). The satellite is noteworthy in that the solar panel (7) is arranged centrally with respect to the face (5) and the screen (14) is secured to the solar panel (7) by an arm (15).

10 Claims, 2 Drawing Sheets

SATELLITE WITH IMPROVED HEAT SINKAGE

The present invention relates to satellites, especially geostationary satellites, and, particularly, the thermal control of said satellites.

It is known that the electronic equipment carried on board satellites dissipates energy in thermal form. To maintain said equipment within an optimal temperature range of operation, it is therefore necessary to remove the excess thermal energy from inside the satellite. It is known, moreover, that such removal of thermal energy is generally achieved by radiation into space.

In the case of a satellite, especially a telecommunications satellite, comprising a north face and a south face, oppositely oriented and respectively orthogonal to the earth's polar axis, it is usual for the heat to be radiated from the satellite into space via said north and south faces which are used as a thermal radiator. Such a process of heat removal is advantageous since the north and south faces:

experience, over a period of a year, minimum sunshine relative to the other faces of the satellite; and have a constant solar illumination over a day, that is to say over a revolution, thus making it possible to avoid overly large variations in temperature.

However, precisely because of this solar illumination which supplies thermal energy to said north and south faces, the removal of heat by them cannot be optimal and may even be insufficient to provide said equipment with a suitable operating temperature.

This drawback is all the more evident since, generally, in a simple and known manner, the radiative surfaces of said north and south faces—which radiative surfaces are the basis of the thermal control of the satellite—are provided for by a solar reflective coating with high infrared emissivity, of the OSR (Optical Solar Reflector) type, which at least partly covers said faces. Indeed, such a coating absorbs a non-negligible part of the incident solar power and therefore exhibits a limited heat sinkage capability. Moreover, OSR coatings have the additional drawbacks of being expensive and of being sensitive to aging under the effects of solar radiation.

To increase the heat sinkage capability of a satellite, document EP-A-0 447 049 proposes to use the solar panels themselves, possibly equipped with auxiliary screens, to cast their shadow permanently onto such a face of the satellite, irrespective of the position of the sun, so that the temperature of this face is lowered and the heat sinkage capability of said face is increased. However, a known embodiment of this type makes it necessary to off-center said solar panels, raising difficulties connected with the control, balancing and rotation of said solar panels.

The object of the present invention is to overcome this drawback.

To this end, according to the invention, the satellite, especially a geostationary satellite, comprising:

at least one face which is used as a thermal radiator for the equipment carried on board said satellite and is arranged in the path of the solar radiation;

at least one solar panel which is a generator of electricity, which is pointed continuously toward the sun and projects from said face; and a screen secured to said solar panel, arranged at the periphery of said satellite and stopping the solar radiation directed toward said face, is noteworthy in that:

said solar panel is arranged centrally with respect to said face; and said screen is secured to said solar panel by an arm.

Of course, the height and width of said screen, as well as its distance from said solar generator, are determined such that the shadow which it casts on said face corresponds at least to the desired sinkage capability.

Such a screen may have a simple shape or an optimized profile, and be in one piece or made from several elements. It can consist of a multilayer material or of a straightforward skin with suitable external coatings which are intended to limit the effects of the sun thereon, and hence on the radiative surfaces, and to enhance their sinkage capabilities. During the launch phase, the screen may already be in the operational position or folded up and in this case it may be deployed automatically or on command.

It goes without saying that the shape of the platform of the satellite can be arbitrary, that the screen can be in line with, inside or outside this platform and that additionally the screen may or may not protrude from the satellite.

Such an arm linking the screen and the solar panel may be a specific component or be built into the generator or into the screen. It may be fixed to any part of the solar generator. However, advantageously, it is secured to the leg of said solar panel.

Said radiative face of the satellite can be planar and covered at least partially with a highly emissive coating.

As mentioned above, a radiative face of this kind can be the north face or the south face of the platform of said satellite.

The FIGURES of the appended drawing will elucidate the manner in which the invention may be practiced. In these FIGURES, identical references designate similar elements.

FIG. 1 illustrates a satellite in its geostationary orbit.

Figure 2:
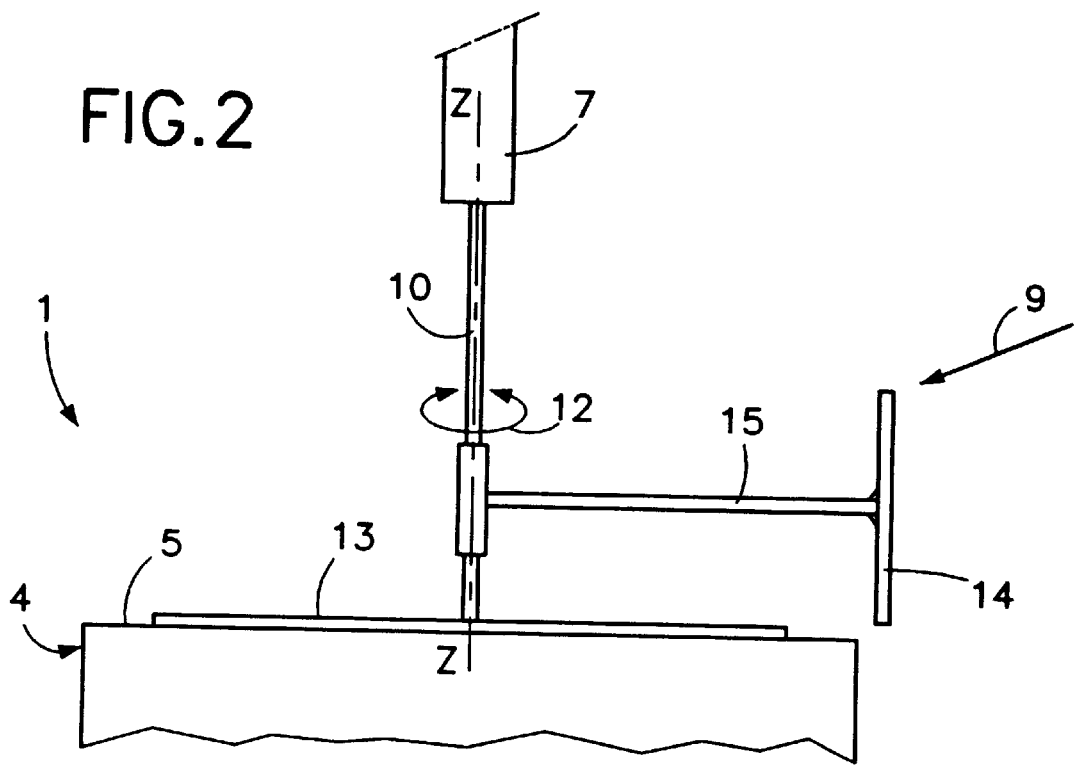
Figure 3:
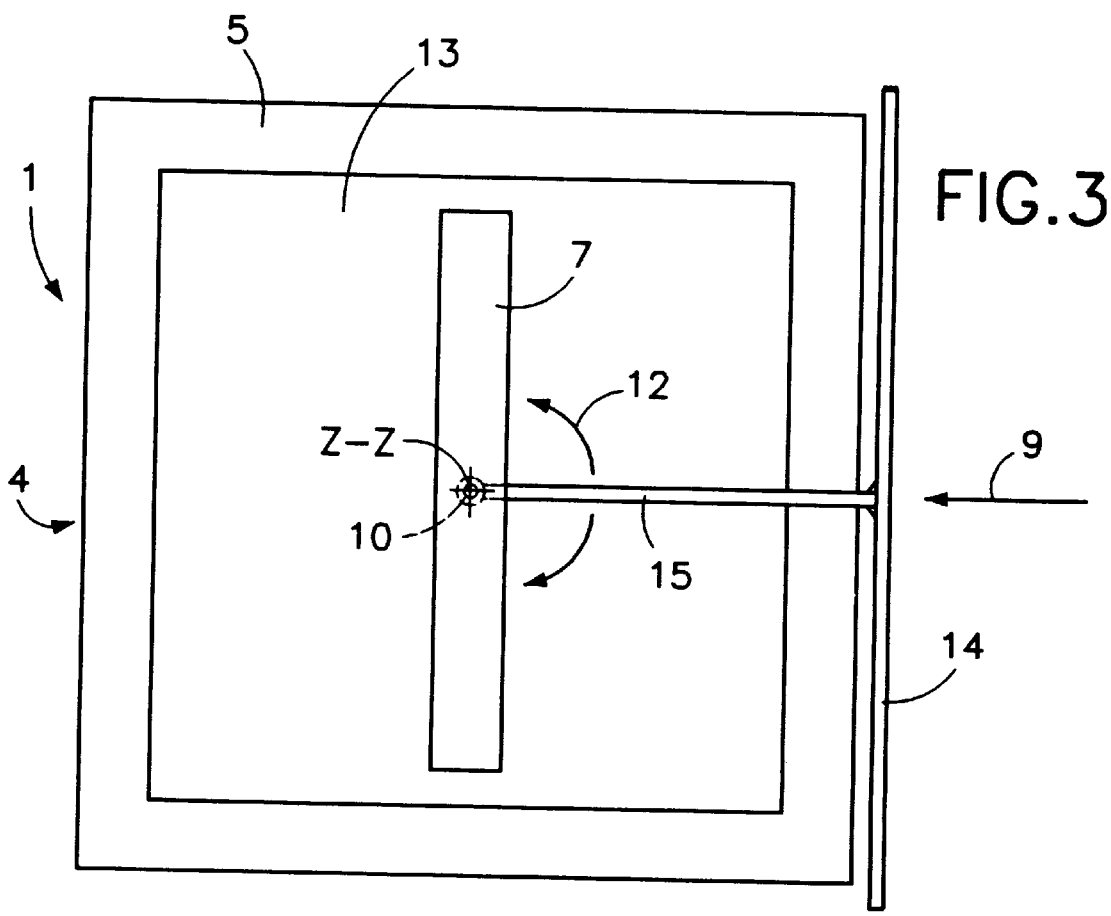

FIGS. 2 and 3 diagrammatically and partially illustrate, in side view and plan view respectively, an embodiment of the satellite according to the invention.

Represented diagrammatically in FIG. 1 is a geostationary satellite 1 in its orbit 2 around the earth 3. The platform 4 of the satellite 1 has, for example, a parallelepipidal shape and it comprises a north face 5 and a south face 6 which are perpendicular to the polar axis of the earth.

Solar panels 7 and 8 are provided in order to supply the satellite 1 with electrical energy and are directed continuously toward the sun, from which they receive the radiation 9. The solar panels 7 and 8 are arranged centrally, projecting from the north face 5 and from the south face 6 respectively, for example by virtue of the legs 10 or 11 securing said panels 7 and 8 of the platform 4. In a known manner, said legs 10 and 11 are articulated so as to allow said panels 7 and 8 to take a position folded up along the platform 4 during the launch of the satellite 1 and a deployed position (that represented in FIG. 1 and described above) when said satellite is placed in its orbit 2.

Moreover, in a likewise known manner, the legs 10 and 11 can rotate about an axis Z—Z (see the curved arrows 12 in FIGS. 2 and 3) orthogonal to said north and south faces 5 and 6, so that said solar panels 7 and 8 can be pointed continuously toward the sun (radiation 9) under the action of a position servocontrol device (which is known but not represented) arranged in the platform 4.

The thermal control of the satellite 1 is achieved by using the north and south faces 5 and 6 as thermal radiators, as has been explained above. For this purpose, these faces carry an emissive coating 13, which at least partly covers them and forms the radiative surface of said faces (see FIGS. 2 and 3).

In accordance with the present invention, and as represented in FIGS. 2 and 3 with regard to the north face 5, a screen 14 is provided, arranged at the periphery of the platform 4 of the satellite and arranged in the path of the solar radiation 9 so that its shadow cast on the face 5 completely covers the latter, or at least its emissive coating 13.

The screen 14 is secured to the leg 10 of the solar panel 7 by an arm 15.

The position and the shape of the screen 14 are provided such that the latter can move in rotation about the axis Z—Z, with said solar panel 7, as a function of the orientation of the solar radiation 9, so that it casts its shadow continuously onto said face 5, or at the very least the coating 13.

What is claimed is:

1. A satellite, especially a geostationary satellite, comprising:
    (a) at least one face (5) which is used as a thermal radiator for the equipment carried on board said satellite (1) and is arranged in the path of the solar radiation (9),
    (b) at least one rotating solar panel (7) projecting from and arranged centrally with respect to said one face (5), said solar panel being a generator of electricity and being pointed continuously toward the sun, and
    (c) a screen (14) arranged at the periphery of said satellite for stopping the solar radiation (9) directed toward said one face (5), said screen being secured to said solar panel (7) by an arm (15).

2. The satellite as claimed in claim 1, wherein said solar panel (7) is connected to said one face (5) by a leg (10) and wherein said arm (15) is secured to said leg (10) of said solar panel (7).

3. The satellite as claimed in claim 1, wherein said one face (5) is at least partially covered by a coating with high infrared emissivity (13).

4. The satellite as claimed in claim 1, wherein said one face (5) is the north face of said satellite.

5. The satellite as claimed in claim 1, wherein said one face is the south face of said satellite.

6. The satellite as claimed in claim 1, wherein said satellite is a geostationary satellite.

7. The satellite as claimed in claim 6, wherein said solar panel (7) is connected to said one face (5) by a leg (10) and wherein said arm (15) is secured to said leg (10) of said solar panel (7).

8. The satellite as claimed in claim 6, wherein said one face (5) is at least partially covered by a coating with high infrared emissivity (13).

9. The satellite as claimed in claim 6, wherein said one face (5) is the north face of said satellite.

10. The satellite as claimed in claim 6, wherein said one face is the south face of said satellite.

* * * * *